A. P. PRATHER.
DEMOUNTABLE WHEEL.
APPLICATION FILED NOV. 23, 1914.
1,170,668.
Patented Feb. 8, 1916.
2 SHEETS—SHEET 1.
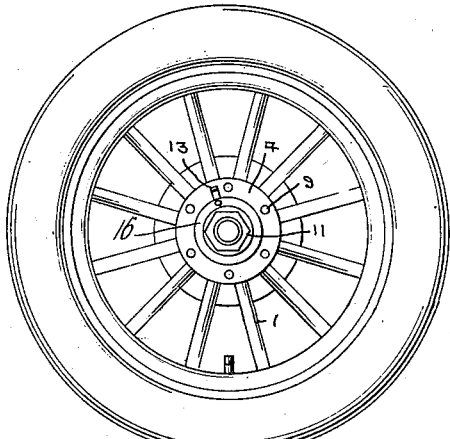
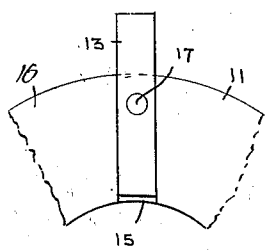
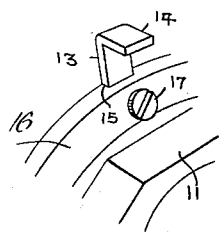
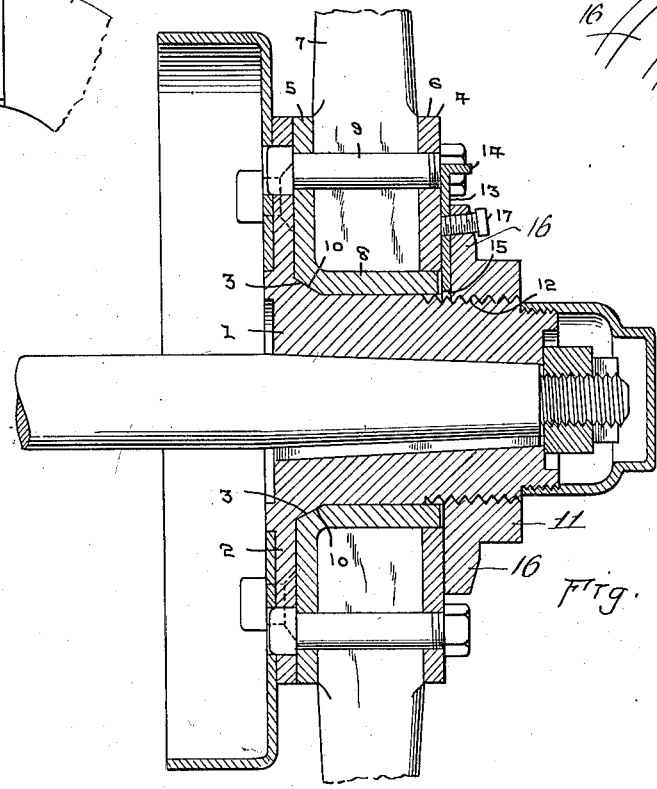
Asa P. Prather — Inventor

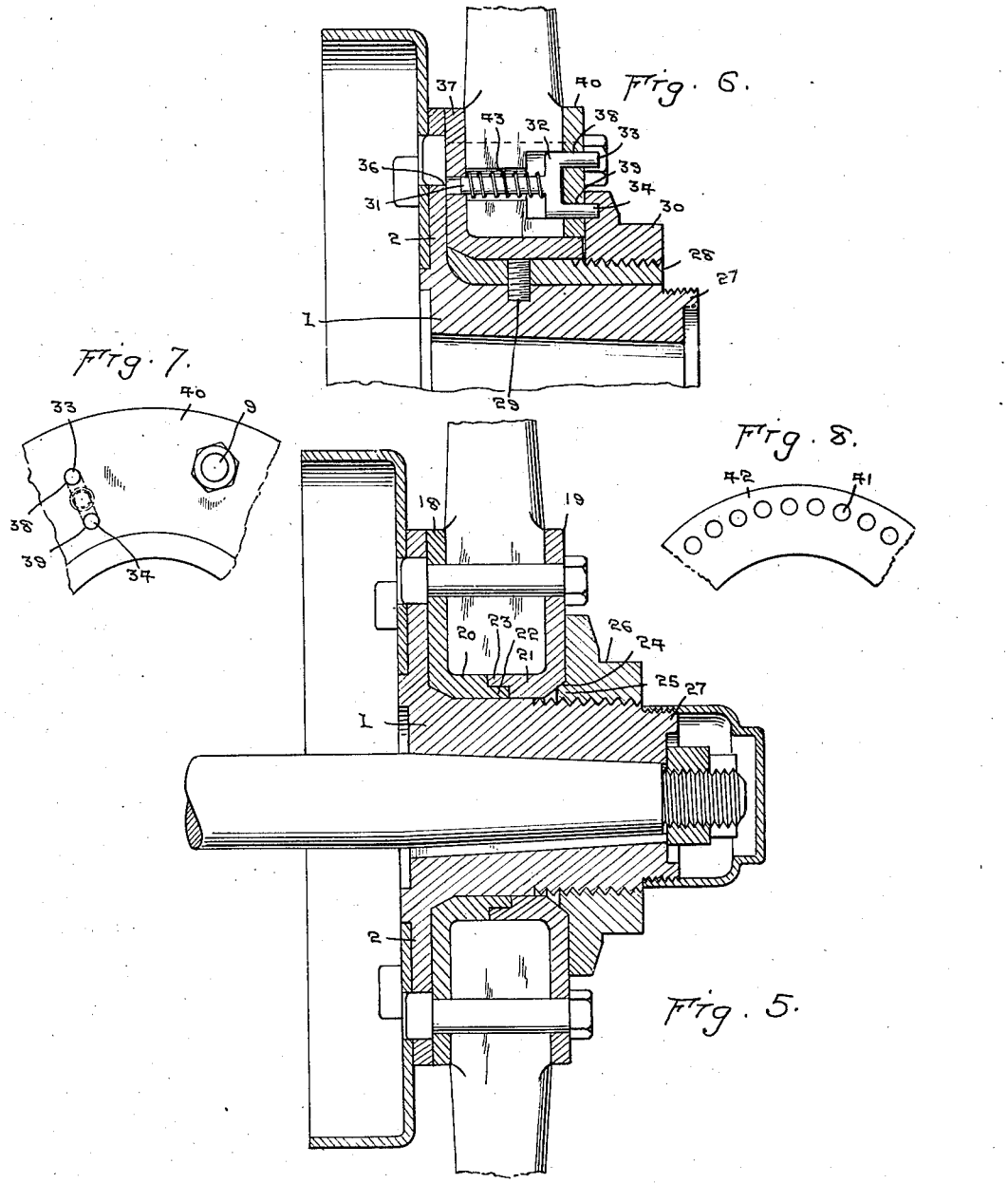

UNITED STATES PATENT OFFICE.

ASA P. PRATHER, OF GEORGETOWN, KENTUCKY.

DEMOUNTABLE WHEEL.

1,170,668.  Specification of Letters Patent.  Patented Feb. 8, 1916.

Application filed November 23, 1914. Serial No. 873,584.

*To all whom it may concern:*

Be it known that I, ASA P. PRATHER, a citizen of the United States, residing at Georgetown, in the county of Scott and State of Kentucky, have invented certain new and useful Improvements in Demountable Wheels; and I do hereby declare the following to be a full, clear, and exact description of the invention, such as will enable others skilled in the art to which it appertains to make and use the same.

My invention relates to new and useful improvements in demountable wheels, and is particularly an improvement over my former Patent No. 1,116,916, issued November 10, 1914, and my prime object is to provide an auxiliary hub section or socket for the reception of the inner ends of the spokes, of such construction that it can be quickly attached to or removed from the hub.

A further object is to provide means to securely lock the auxiliary or coöperating hub member in firm and rigid engagement with the hub proper.

A further object is to provide means for securing the locking mechanism against rotation after it has been attached to the parts of the hub.

Other objects and advantages will be hereinafter set forth and more particularly pointed out in the accompanying specification.

In the accompanying drawings which are made a part of this application, Figure 1 is a side elevation of a wheel employing my improved device and showing the same locked in position on a hub. Fig. 2 is an enlarged detail central sectional view of the device. Fig. 3 is a fragmentary perspective view of one form of locking means for holding parts of the device from undue rotation. Fig. 4 is an elevation thereof. Fig. 5 is a sectional view showing a modified form of receptacle for the ends of the spokes. Fig. 6 is a detail sectional view showing a modified construction of the locking mechanism. Fig. 7 is a detail elevation of the form of locking mechanism shown in Fig. 6, and Fig. 8 is a detail elevation of the form of nut employed in connection with the locking mechanism shown in Figs. 6 and 7.

Referring to the drawings in which similar reference numerals designate corresponding parts throughout the several views, 1 indicates a hub, which in this instance is constructed of heavier material than is used in the ordinary hub, said hub having a circumferential flange 2 at its inner end, the peripheral face of the hub, adjacent its connection with the flange 2 having a bevel portion 3 for a purpose to be hereinafter set forth.

Adapted to coöperate with the hub proper 1 is an auxiliary hub 4 which is preferably constructed in two sections 5 and 6, said sections, when properly secured together, forming a channel for the reception of the lower ends of the spoke members 7. Section 5 is preferably constructed substantially L-shaped in cross section to form a base member 8 upon which the ends of the spokes rest, the section 6 being substantially in the form of a disk and when the spokes are seated within the auxiliary hub, bolts or the like 9 are extended transversely through the sections 5 and 6 and between the spokes 7, said bolts securely locking the two sections of the auxiliary hub together and firmly clamping the spokes therein. The apex or inner edge of the section 5 at its juncture with the base 8 is beveled as shown at 10, which bevel coöperates with the bevel 3 on the hub, the object of said beveled portions being to firmly seat the auxiliary hub on the main hub by giving the same a wedging action, this being required in view of the fact that the auxiliary hub is constructed to freely pass over the hub 1 when being introduced thereon or removed therefrom.

After the auxiliary hub has been introduced on the main hub, it is securely locked into position thereon and the beveled portions firmly engaged with each other by means of a nut 11, said nut engaging threads 12 upon the exterior of the hub 1 at the outer end of the hub and it will be readily seen that when the nut 11 is properly turned home, the auxiliary hub will be securely clamped between said nut and the flange 2 of the hub. In order to compensate for any shrinkage or wear at the inner ends of the spokes, whereby said spokes would fit loosely within the auxiliary hub, the base 8 is made slightly shorter than the extreme width of the auxiliary hub, resulting in the section 6 projecting slightly beyond the end of the base, so that by tightening the nut 11 or the bolts 9, the section 6 will move inwardly and take up the space occasioned by said shrinkage or wear. It will further be seen that by shortening the end of the base 8, the nut 11 will always find a bearing against the section 6, and constantly direct pressure against the ends of the spokes. If deemed advisable the threads 12 may be turned on to the hubs as right and left hand threads, but in this instance, I have shown a locking means which will positively prevent the nut from leaving the end of the hub, which consists of a key 13, the upper end of which is preferably provided with an angular projection 14, which rests in the path of the ends of the bolts 9, said key being entered in a seat 15 provided in the inner face of the flange 16 of the nut and in order to hold the key in position, a screw or the like 17 is entered through the flange 16 and through the key 13 thereby positively locking the key in engagement with the nut.

In Fig. 5 of the drawings, I have shown a slightly modified form of auxiliary hub which consists of the sections 18 and 19, both of said sections being substantially L-shaped in cross section to form the base members 20 and 21. The section 20 has a tongue 22 which is designed to overlap and coöperate with the tongue 23 of the section 19, the corner of section 19, at its intersection with the base 21, being also tapered, or beveled as shown at 24, to coöperate with the beveled rib 25, of the nut 26, thus insuring a close fit of the auxiliary hub upon the main hub.

In Fig. 6 of the drawings, I have shown the form of device for attaching the auxiliary hub to the ordinary form of hub 27, now in common use, and as the walls of the said hub are of less thickness than the walls of the hub in my improved construction, a sleeve 28 is introduced over the hub 27 and secured thereon in any preferred manner as by sweating or by the means of studs 29. In this figure and in Figs. 7 and 8 I have also shown a varied form of locking device for the nut 30, which consists of a shaft 31 having at one end a cross head 32 from the ends of which project fingers 33 and 34, the shaft 31 projecting transversely between the spokes 35 and having its free end seated in an orifice 36 in the member 37, said shaft being longitudinally movable in said orifice. The fingers 33 and 34 extend through openings 38 and 39 in the section 40 of the auxiliary hub and normally project a distance beyond the outer face of said section, the finger 34 being adapted to engage any one of a plurality of seats 41 formed in the inner face of the flange 42 of the nut. A coil spring 43 is introduced around the shaft 31 and between the walls of the section 37 and the cross head 32, the tension of said spring being sufficient to normally hold the fingers 33 and 34 in an outward position.

By this device, it will be readily seen that by applying pressure to the finger 33, the finger 34 will be moved out of the path of the flange of the nut 30 until such a time as the nut has been turned home on the sleeve, when, by releasing the pressure on the finger 33, the spring will immediately extend the finger 34 into engagement with one of the seats in the face of the flange of the nut 30 and will hold said nut against rotation until such time as inward pressure is again exerted against the finger 33 to release the finger 34 from engagement with the seat in the flange.

In this device, it will be readily seen that I have provided means whereby the spokes, felly and tire may be quickly removed from the hub and a new wheel introduced thereon and at a minimum expense of time and labor. It will further be seen that I have provided a positive means for engaging and holding the inner ends of the spokes in their relative position and in view of the simplicity of the parts employed, any one or all of the spokes may be quickly released and new ones inserted in their place. It will further be seen that this device will be of great benefit for tourists or those engaged in racing, in view of the rapidity with which one wheel may be removed and another attached.

What I claim is:

1. In a demountable wheel, the combination with a hub having exterior threads thereon, and a flange at one end of the hub, the face of the hub adjacent the flange being beveled, of an auxiliary hub comprising two sections, one of said sections being substantially L-shaped in cross section and forming a base, a portion of said last section having a bevel to coöperate with the bevel of the hub, means to lock said sections together and clamp spoke members therein, a locking nut coöperating with the threads of the hub, the inner face of said nut having a seat, and a locking key entering said seat and coöperating with said locking means for said sections to limit the rotation of the nut when applied to use.

2. In a demountable wheel, the combination with a hub having threads on the exterior thereof, and a flange at one end, of an auxiliary hub comprising two side sections, and a base portion, said side sections and base portion forming a receptacle for the ends of spokes, bolts to secure the sections together and clamp the spokes therebetween, a nut engaging the threads on the hub and adapted to lock the auxiliary hub in firm engagement with the main hub, said nut having a seat in its inner face, and a locking key coöperating with said seat and the section securing bolts to limit the rotating movement of said nut.

3. In a demountable wheel, the combination with a hub having threads adjacent one end and a flange at the opposite end, of an auxiliary hub, comprising two side sections, one of said sections having a base portion integral therewith, bolts to secure the sections together and clamp the ends of spoke members therebetween, said base member being of less length than the extreme width of the sections when applied to use, a nut coöperating with the threads of the hub to lock the auxiliary hub in position thereon, said nut having a vertically extending seat in the face thereof, a locking key adapted to enter said seat and having its outer end projecting in the path of said bolts to limit the rotating movement of said nut, and a binding screw extending through the nut and key to hold the key against longitudinal movement.

4. In a demountable wheel, the combination with a hub having threads thereon, and an auxiliary hub formed of sections and bolts extending transversely through the sections to clamp spoke ends therebetween, of a nut coöperating with the threads of the hub, said nut having a seat therein, a key adapted to fit said seat, and a binding screw extending through said nut and key and against the face of one of the spoke receiving sections.

In testimony whereof I have signed my name to this specification in the presence of two subscribing witnesses.

ASA P. PRATHER.

Witnesses:
 SAM'L W. COCKRELL,
 C. S. FRYE.

Copies of this patent may be obtained for five cents each, by addressing the "Commissioner of Patents, Washington, D. C."